April 18, 1967 K. RAITHEL 3,314,832

METHOD FOR HEAT TREATING OF MONOCRYSTALLINE SEMICONDUCTOR BODIES

Filed March 17, 1964

2 Sheets-Sheet 1

April 18, 1967 K. RAITHEL 3,314,832

METHOD FOR HEAT TREATING OF MONOCRYSTALLINE SEMICONDUCTOR BODIES

Filed March 17, 1964

2 Sheets-Sheet 2

United States Patent Office 3,314,832
Patented Apr. 18, 1967

3,314,832

METHOD FOR HEAT TREATING OF MONOCRYSTALLINE SEMICONDUCTOR BODIES

Kurt Raithel, Uttenreuth, Germany, assignor to Siemens-Schuckertwerke Aktiengesellschaft, Erlangen, Germany, a corporation of Germany Filed Mar. 17, 1964, Ser. No. 352,599
Claims priority, application Germany, Dec. 7, 1962, S 82,758; Mar. 29, 1963, S 84,444
5 Claims. (Cl. 148—186)

My invention relates to the heat processing of monocrystalline semiconductor bodies for fabricating purposes employed in semiconductor techniques, such as the diffusion of dopant into monocrystalline silicon discs for use in diodes, transistors or other semiconductor devices; and is disclosed herein as a continuation-in-part of my copending application Ser. No. 326,498, filed Nov. 27, 1963, now abandoned, and assigned to the assignee of the present invention.

According to such diffusion methods, the semiconductor body, for example a wafer or disc of silicon or germanium, is heated in a processing vessel to the diffusion temperature, and a supply of the doping substance is simultaneously heated in the same processing vessel but in spaced relation to the semiconductor body. By controlling the temperature of the dopant source and hence the vapor pressure of the gaseous dopant, the concentration of the dopant diffusing into the surface region of the semiconductor body can be controlled as desired. For example, p-type regions in fourth-group semiconductors can thus be produced with such dopants as aluminum, boron or gallium.

It is an object of my invention to improve diffusion methods of the above-mentioned type toward better reproducibility and uniformity of the resulting products.

It has been found that when performing a diffusion process of the above-mentioned kind or other thermal processes in ampoules or similar vessels of quartz material, undesired impurities can penetrate from the environment, for example the furnace atmosphere, into the interior of the vessel. Particularly in cases where a prolonged processing time is needed, for example of more than 24 hours, the presence of previously unobserved heavy metals such as copper, nickel and iron can be ascertained. Apparently the metals enter through the quartz wall which is permeable to atoms of these substances at the high temperatures being employed. The ingress of such impurities impairs the semiconductor bodies located in the quartz vessel by forming recombination centers in the semiconductor material.

It has been proposed (French Patent 1,293,554) to provide the quartz vessel with a coating that prevents penetration of the undesired contaminations during heat treatment. Such coatings, however, leave much to be desired because when the quartz vessel is being heated up from room temperature to more than 1000° C., for example to 1250° C. when processing silicon, the coating tends to scale off because its thermal expansion differs from that of the quartz vessel.

It is, therefore, another object of my invention, akin to the one mentioned above, to reliably prevent ingress of undesired impurities into a vessel of quartz material during heat processing of monocrystalline semiconductor bodies while also avoiding the shortcomings of metal-coated vessels.

According to my invention, the heat treatment of the semiconductor bodies within the quartz vessel is performed after producing on the inner wall surface of the vessel a deposit of monoxide of the semiconductor material. Preferably applied is this method to the processing of silicon bodies, the deposit then consisting of silicon monoxide. Preferably, the monoxide deposit is produced only within a limited region of the inner vessel wall. Relating to the processing of silicon, this region is preferably maintained at a temperature of approximately 950° C. while the semiconductor bodies are being heat treated. However, the temperature of the region may depart from the preferred value within the approximate limits of 920 and 980° C.

The internal deposit or coating of silicon monoxide appears to act as a getter upon the penetrating undesired impurities. These phenomena have not yet been fully explained. However, tests have shown that by virtue of the invention the reduction of the diffusion length of the minority charge carriers usually occurring in semiconductor bodies that are being processed for prolonged periods of time in quartz vessels is greatly minimized and often fully prevented.

According to another feature of my invention, dealing specifically with diffusion doping of semiconductor bodies the semiconductor bodies consisting of silicon or other substance from the fourth group of the periodic system, and a source quantity of the dopant, such as gallium, are placed into a processing vessel at mutually spaced locations. Then a deposit or precipitation of semiconductor monoxide is provided on the inner vessel surface near the dopant source quantity, before commencing the diffusion process proper by controlled heating of the dopant source quantity and simultaneous heating of the semiconductor bodies in the vessel.

According to still another feature of my invention, the monoxide of the semiconductor material is preferably produced by oxidizing the material of the semiconductor bodies in the sealed processing vessel, and precipitating the resulting monoxide on the desired region of the inner vessel surface, such as in the vicinity of the above-mentioned source quantity of dopant.

Aside from the above-mentioned protection from undesired impurities, the presence of the semiconductor monoxide within the heat treating vessel has been found to have another advantageous function not necessarily predicated upon the use of quartz material for the processing vessel. In the performance of diffusion tests prior to the invention, it was found that the edge concentration of gallium diffused into the semiconductor body was not in accordance with that expected from the vapor-pressure curve of gallium. From this observation it was surmised that the transfer of gallium from the gallium source to the semiconductor body had not taken place exclusively by way of the vaporous gallium phase but at least in part, if not to a major or virtually full extent, by way of a chemical transport reaction. According to another feature of the invention, therefore, the monoxide of the semiconductor material is employed as the transporting medium. Carried out in this manner, the diffusion method of doping affords very accurately reproducible results to an extent heretofore not attainable in any other manner. Relative to doping by gallium, it can be presumed that the monoxide of the semiconductor material causes the formation of gallium suboxide, and that the transport takes place through the vaporous phase of gallium suboxide.

The invention will be further described with reference to preferred embodiments exemplified by the accompanying drawings in which.

With reference to the drawings, the invention will be described presently as applied to the production of a doped region in a silicon body by diffusing gallium into the body and thereafter tempering the body.

Figure 1:
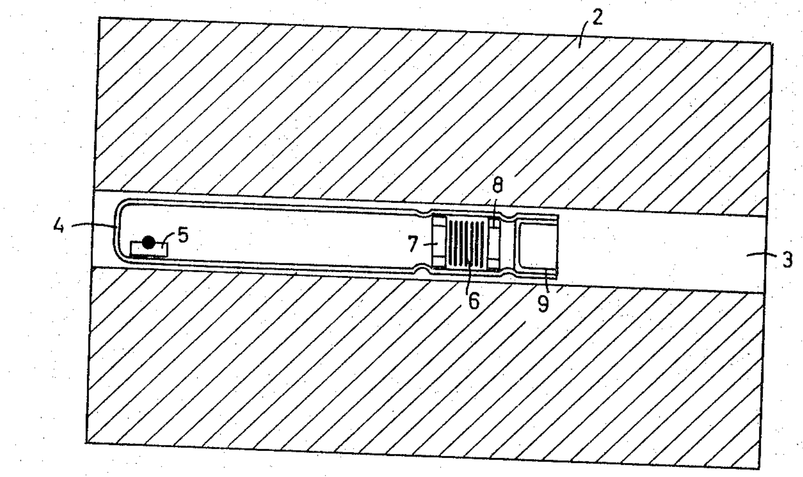
FIG. 1 shows in section a device for performing the method.

Shown in FIG. 1 at 2 is a furnace consisting of a tubular body whose opening 3 is open at both ends and into which the material to be processed can be inserted. The furnace tube can be heated from the outside in any suitable manner, for example by means of an electric resistance winding (not shown) surrounding the furnace tube. During stable-state operation, the temperature profile obtaining in the interior of the furnace tube extends from the openings toward the middle and increases from both openings inwardly up to a constant maximum temperature which is constant along an axially short portion near the middle. For the purpose of the example presently described, this middle-range temperature is preferably adjusted to 1230° C., relating to the doping of silicon discs. The temperature profile of the furnace may be symmetrical or asymmetrical. For producing a p-doped region in silicon discs, the discs are placed into the just-mentioned temperature range of 1230° C. and are then left located in this range. The gallium source quantitiy is placed at a different location of the furnace where a lower temperature obtains. This other locality is to be chosen in accordance with the particular temperature profile of the furnace and the desired edge concentration of the gallium to be diffused into the silicon discs. Used as processing vessels are preferably quartz ampoules of the required length, which are shoved into the furnace opening 3.

FIG. 1 shows such a quartz ampoule 4 in the furnace tube 3. Located in the ampoule at one end thereof is a gallium source 5 which in the illustrated embodiment is formed of a small piece of silicon having a cavity machined into the top surface and filled with a drop of gallium. The silicon discs 6 to be processed are located at the opposite end of the quartz ampoule 4 and are held in position by two spacers 7 and 8 consisting of annular quartz pieces cut from a tube and having a diameter somewhat smaller than the inner diameter of the ampoule. Placed into the opening of the ampoule is a quartz stopper 9 of approximately U-shaped cross section. After evacuating the vessel, the stopper is fused together with the ampoule by means of a gas burner. The quartz ampoule 4, constituting the processing vessel, is thus completely sealed from the environment, and the diffusion method takes place entirely in the interior of the sealed vessel.

Figure 2:
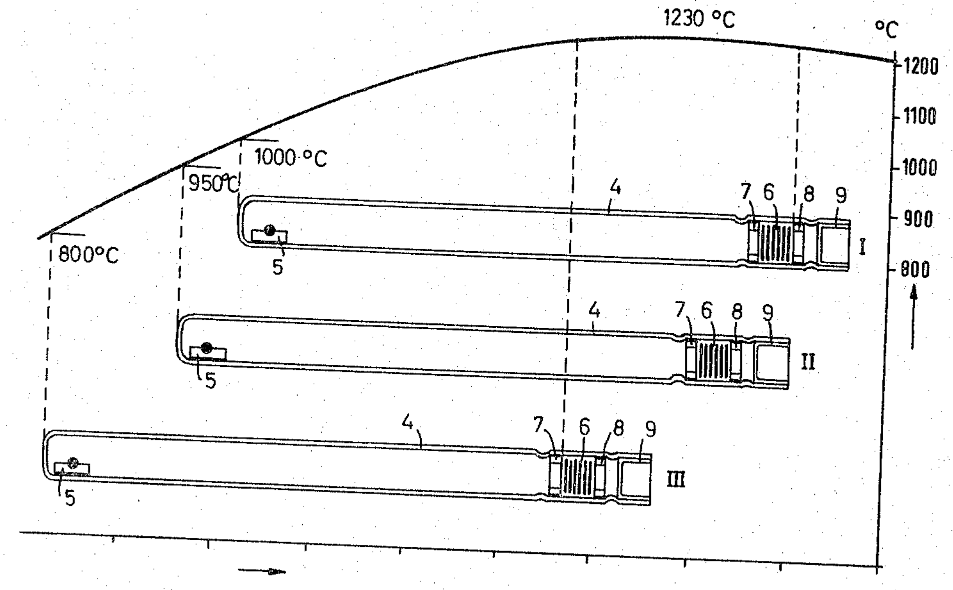
FIG. 2 is an explanatory graph correlated to two different positions of a processing vessel as shown in FIG. 1.

FIG. 2 shows the quartz ampoule 4 in two positions with respect to the temperature profile T of the furnace employed. In the position I the gallium source 5 is in the temperature range of about 1000 to 1050° C. Shown at II is the position to which the gallium source has been shifted so as to be located in a temperature range of about 950° C. In both positions I and II, the silicon discs 6 remain in the center portion of the furnace where a substantially constant temperature of about 1230° C. obtains. As a rule, a higher temperature cannot be employed because this would be detrimental to the mechanical stability of the evacuated quartz ampoule.

The method is carried out as follows: After the furnace is heated up to stable temperature conditions as required for the method, the quartz ampoule, prepared outside of the furnace, is shoved to the position I. This is done as rapidly as feasible, care being taken that the insertion of the ampoule into the hot furnace is completed in less than 1 minute. Silicon monoxide now evolves from the silicon discs. This is probably due to the fact that a reduction of quartz and oxidation of silicon occur at the point of contact between silicon and quartz ($SiO_2$). The silicon monoxide precipitates predominantly in the temperature range of about 1000 to 1100° C. This is the reason why the ampoule must be placed rapidly into the desired position, because otherwise an undesired locality between the gallium source and the semiconductor bodies might become seeded with a precipitate of silicon monoxide. This would have the result that the further formation of the precipitation occurs preferentially at such undesired location, thereby preventing the desired precipitation of monoxide near the gallium source.

The quartz ampoule 4 remains in position I until the desired precipitation is formed in the vicinity of the gallium source 5. The precipitation exhibits a brownish color readily observable by visual inspection. The success of the method, therefore, can be optically determined already at an early stage. After about 10 minutes, the precipitation usually possesses a sufficient density. It is preferable, however, to leave the quartz ampoule in position I for some additional amount of time, up to 1 hour.

Figure 3:
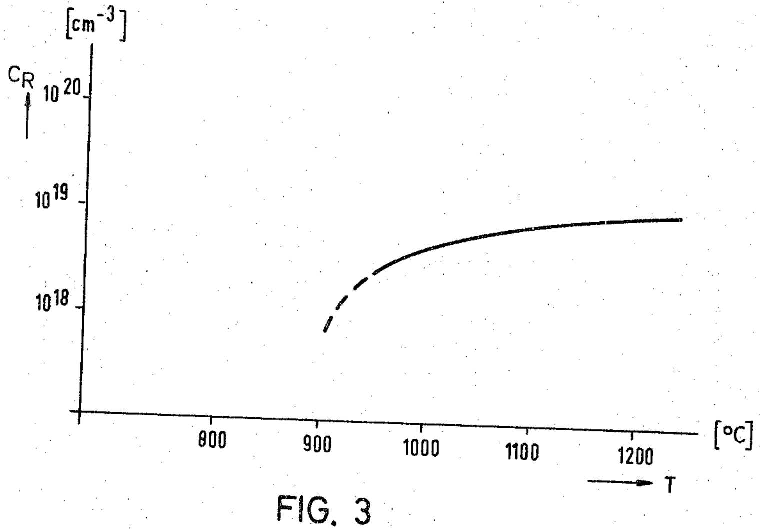
FIG. 3 is a graph representing the edge or surface concentration $C_R$ of dopant in a diffusion-doped semiconductor body versus the temperature of the gallium source.

Thereafter, the diffusion process proper is effected. For this purpose the ampoule is shifted to position II and kept in this position for the duration of the diffusion. This duration depends upon the desired thickness of the diffusion-doped region. Sufficient are 5 or 10 hours, but prolonged periods, for example 30 or 48 hours, are also applicable. After performing the diffusion, the furnace is slowly cooled, for example about 2° C. per minute. By adjusting the position of the gallium source 5 with respect to the temperature profile, the edge concentration of the gallium diffused into the silicon can be controlled and adjusted as may be desired. FIG. 3 shows a diagram of the edge concentration $C_R$ in gallium atoms per $cm.^3$ versus the temperature of the gallium source. The diagram relates to a silicon temperature of 1230° C.

Another and preferred way of proceeding after completing the diffusion treatment is to shift the ampoule so that the gallium source 5 is placed to the position III. This stops the gallium source from functioning, and no further precipitation of silicon monoxide takes place in the new temperature range of the gallium source, at about 800° C. For that reason, the further supply of gallium is negligibly slight, whereas the protection from penetration of impurities into the vessel, as may form recombination centers in the semiconductor material, remains fully effective during the subsequent heat treatment.

When the quartz vessel is in position III, a precipitation of silicon monoxide is often formed in a vessel portion somewhat closer to the silicon discs. In this position III, the silicon discs 6 are subjected to tempering by maintaining them at a temperature of approximately 1230° C. During tempering the edge concentration of the gallium diffused into the silicon decreases, whereas the penetrating depth further increases.

In the production of certain semiconductor components, for example silicon controlled rectifiers or similar four-layer devices of thyratron-type switching performance, it is desirable to provide for a given concentration of the penetrated impurities at a given depth of the semiconductor material. For this purpose, an alloying process can be employed with the effect of again reversely doping the semiconductor material, and a given concentration of dopant is then expected to prevail at the location of the desired p–n junction. The alloying process, however, has the disadvantage that the penetrating depth of the alloy when molten, and hence the position of the resulting p–n junction, cannot be accurately predicted. Hence, when the dopant concentration possesses a relatively steep gradient, it may happen that the p–n junction is not located in the range of the desired dopant concentration. Now, if a tempering process as described above is applied, the dopant concentration changes only slightly with the penetrating depth. Hence the desired conditions can much more easily and more reliably be satisfied.

Figure 4:
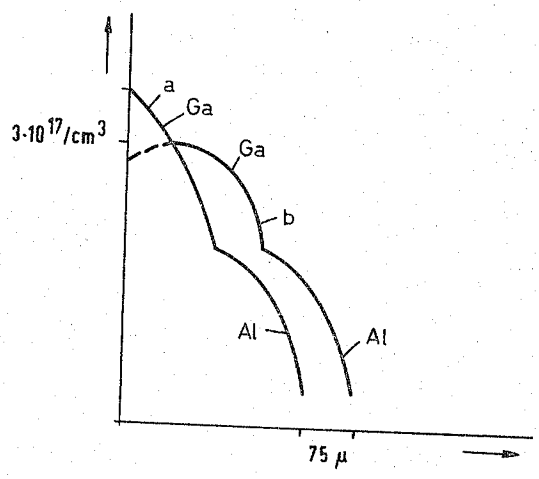
FIG. 4 is a graph representing the concentration of diffused dopants in dependence upon their depth of penetration into a silicon body.

Shown in FIG. 4 is the concentration of entered dopant impurities versus the penetrating depth. Curve "*a*" indicates a dopant concentration prior to tempering, and curve "*b*" the concentration after tempering. In the curve portions denoted by Ga, the gallium concentration preponderates, in the curve portions denoted by Al, the aluminum dopant (stemming from a prior diffusion operation) is preponderant. It will be seen that the curve "*b*" exhibits an only slight variation in concentration within a given range ($3 \cdot 10^{17}$ atoms per $cm.^3$). Consequently in this region, a new reverse doping by an alloying operation, for example with the aid of an antimony-containing gold foil, produces a p–n junction whose concentration on the side of the p-type material can be accurately predetermined with great reliability. By other temperature-time programs, regions having a desired other concentration of approximately uniform value, can thus be produced analogously.

Utmost cleanliness is a prerequisite for the desired results. Proper preparation is therefore important. For example, before using the quartz ampoule in the above-described manner, it is preferably filled with aqua regia and kept standing for several hours, for example 16 hours. Thereafter the ampoule is rinsed with a processing liquid consisting of ten parts of hydrofluoric acid (40%), ten parts fuming nitric acid and eighty parts distilled water. Then the ampoule is dried for one-quarter to one-half hour in a furnace at about 1100 to 1200° C. The stopper 9 as well as the spacers 7 and 8 are treated in the same or a similar manner.

The silicon piece 5 at the gallium source may be made for example of a flat circular silicon disc having a thickness of about 3 mm. and provided with a cavity at the top. The disc is to be etched by a CP-etchant as generally used in semiconductor techniques (consisting of hydrofluoric acid mixed with nitric acid). The gallium is then placed on the disc in the shape of a ball about 2 to 3 mm. in diameter. Thereafter, the gallium source, thus prepared, is heated at about 1000° C. in vacuum of less than $10^{-5}$ Torr (mm. Hg) whereby impurities, for example chlorides and lower oxides, are removed. Thereafter the gallium source is used as soon as possible for the above-described diffusion process.

The quartz ampoule may be given a length of about 30 cm. and an inner diameter of about 25 mm. The silicon discs to be processed in the ampoule may have a diameter of about 20 mm. and an individual thickness of 400 microns. As many as 80 to 100 silicon discs, for example, can be processed simultaneously in such an ampoule.

After inserting the gallium source into the ampoule, the silicon discs and the stopper are also inserted, whereafter the ampoule is evacuated and shoved into a preheating furnace. With the vacuum pump kept running, the quartz ampoule is heated for about 1 hour at about 1000° C. Thereafter the ampoule is permitted to slowly cool down to about 700° C. At this temperature the stopper piece 9, previously inserted into the opening, is fused together with the ampoule so that the ampoule is now sealed from the ambient atmosphere. Thereafter the prepared ampoule can be inserted into the diffusion furnace as already described.

The deposit of the semiconductor monoxide may also be produced in any suitable other manner. For example, the monoxide of the semiconductor material can be used in pulverulent form. After placing the powder into the quartz ampoule, the powder can be vaporized by heating and is then caused by proper temperature control to precipitate at the desired locality. Various modifications of the method, particularly the temperatures and processing periods employed, are likewise applicable. If desired, the method can be performed in a protective gas atmosphere instead of in vacuum. In the latter case, the following operations are performed subsequent to preheating the quartz ampoule under vacuum:

The protective gas, for example argon or other noble gases, but not nitrogen, is filled into the quartz ampoule up to a pressure of 150 Torr, and only thereafter is the ampoule sealed by fusing the stopper thereto. Performing the method under protective gas has the advantage that the quartz ampoule cannot readily collapse at increased temperatures because the interior gas pressure compensates for the external pressure. The gas filling does not contribute to promoting the method of the invention as such. It also appears to affect the method only to a very slight extent, resulting in a slight reduction of the edge concentration $C_R$ in the diffused diffusion-doped semiconductor discs.

While the foregoing examples relate to the doping of silicon, the invention is analogously applicable to other fourth-group semiconductors, particularly germanium. It will be understood that in such cases the diffusion temperatures employed are to be chosen in accordance with those known and generally used for diffusion-doping of the particular semiconductor substance, these temperatures being lower for germanium than those given above with reference to silicon.

I claim:

1. The method of applying to monocrystalline semiconductor bodies for use in semiconductor devices a heat treatment in a vessel of quartz material, which comprises placing the semiconductor bodies into the vessel and also placing an additional silicon body into the vessel at a location spaced from the bodies and thereafter sealing the vessel, heating the vessel at the location of the additional silicon body to a temperature above 1200° C. and simultaneously maintaining the vessel near said semiconductor bodies at a temperature of 1000 to 1100° C. to produce a coating of silicon monoxide on the vessel wall, and thereafter performing the heat treatment upon the semiconductor bodies inside the vessel.

2. The method of claim 1, wherein the heat treatment is performed while maintaining the coating at a temperature of about 920 to 980° C.

3. The method of producing a p-doped region in a semiconductor body of silicon, which comprises sealing the silicon body and a quantity of gallium into a vessel of quartz at mutually spaced locations, heating the silicon body to above 1200° C. to form silicon monoxide and simultaneously keep the gallium locality at a temperature of about 1000 to 1100° C. for causing the evolving monoxide to precipitate near said gallium quantity, and thereafter diffusing gallium from said quantity into said silicon body by lowering the temperature of said quantity to approximately 950° C. for effecting diffusion doping while maintaining the silicon body above 1200° C.

4. The method of claim 3, wherein subsequent to the diffusion doping, the temperature of the gallium quantity is lowered to below 920° C., while maintaining the silicon body above 1200° C. to cause the dopant to diffuse into a greater depth.

5. The method of claim 4, wherein the temperature of the gallium quantity is lowered to about 800° C.

References Cited by the Examiner

UNITED STATES PATENTS

| | | | |
|---|---|---|---|
| 2,956,913 | 10/1960 | Mack | 148—189 X |
| 3,007,816 | 11/1961 | McNamara | 148—189 |
| 3,178,798 | 4/1965 | Marinace | 148—175 X |
| 3,200,019 | 8/1965 | Scott | 148—187 X |

HYLAND BIZOT, *Primary Examiner.*